United States Patent
Uchiyama et al.

(10) Patent No.: US 6,354,390 B1
(45) Date of Patent: Mar. 12, 2002

(54) POWER ASSISTED WHEELCHAIR

(75) Inventors: Atsushi Uchiyama; Hiroaki Ogata, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/046,193

(22) Filed: Mar. 23, 1998

(51) Int. Cl.[7] .............................. B60K 1/00; B62D 11/00
(52) U.S. Cl. ...................... 180/65.1; 180/6.5; 180/907
(58) Field of Search ................... 180/65.2, 65.8, 180/907, 65.5, 6.5, 6.48, 65.1, 206, 220, 65.3

(56) References Cited

U.S. PATENT DOCUMENTS

| | | | | |
|---|---|---|---|---|
| 4,021,690 A | * | 5/1977 | Burton | 180/65.5 |
| 4,062,421 A | * | 12/1977 | Weber | 180/65.2 |
| 4,511,825 A | * | 4/1985 | Klimo | 318/67 |
| 4,634,941 A | * | 1/1987 | Klimo | 318/139 |
| 4,671,524 A | * | 6/1987 | Haubenwallner | 280/212 |
| 4,773,495 A | * | 9/1988 | Haubenwallner | 180/65.2 |
| 5,078,227 A | * | 1/1992 | Becker | 180/221 |
| 5,199,520 A | * | 4/1993 | Chen | 180/65.5 |
| 5,222,567 A | * | 6/1993 | Broadhead et al. | 180/15 |
| 5,234,066 A | * | 8/1993 | Ahsing et al. | 180/6.5 |
| 5,246,082 A | * | 9/1993 | Alber | 180/65.5 |
| 5,366,037 A | * | 11/1994 | Richey | 180/65.5 |
| 5,427,193 A | * | 6/1995 | Akakian | 180/65.5 |
| 5,450,915 A | * | 9/1995 | Li | 180/65.5 |
| 5,555,949 A | * | 9/1996 | Stallard et al. | 180/6.5 |
| 5,755,304 A | * | 5/1998 | Trigg et al. | 180/65.5 |
| 5,818,189 A | * | 10/1998 | Uchiyama et al. | 318/488 |
| 5,860,487 A | * | 1/1999 | Tanaka et al. | 180/206 |
| 5,878,829 A | * | 3/1999 | Kanno et al. | 180/65.5 |

FOREIGN PATENT DOCUMENTS

| | | | |
|---|---|---|---|
| EP | 0 687 454 A1 | * 12/1995 | A61G/5/04 |
| EP | 0687454 | 12/1995 | |
| EP | 0776647 | 6/1997 | |
| EP | 0790049 | 8/1997 | |

OTHER PUBLICATIONS

European Search Report dated Sep. 2, 1998.

\* cited by examiner

*Primary Examiner*—Brian L. Johnson
*Assistant Examiner*—Bridget Avery
(74) *Attorney, Agent, or Firm*—Ernest A. Beutler

(57) ABSTRACT

An electric power assisted, manually operated vehicle such as a wheelchair. A force sensor senses the manual input force and the power assist is generated in response to the sensed input force. A number of embodiments are disclosed wherein the amount of assist is varied in response to running conditions and/or operator conditions so as to improve the performance. In many of these embodiments, the assist is greater at low speeds and is held constant at higher speeds and then decreased as the speed exceeds a predetermined high speed. In some of these embodiments, a regenerative braking is also applied in the event the vehicle speed becomes excessive. Also, the null or dead band range of the sensor is adjusted so as to provide a wider range when stationary than when running. This decreases sensitivity for startup and yet provides good response during running.

45 Claims, 13 Drawing Sheets

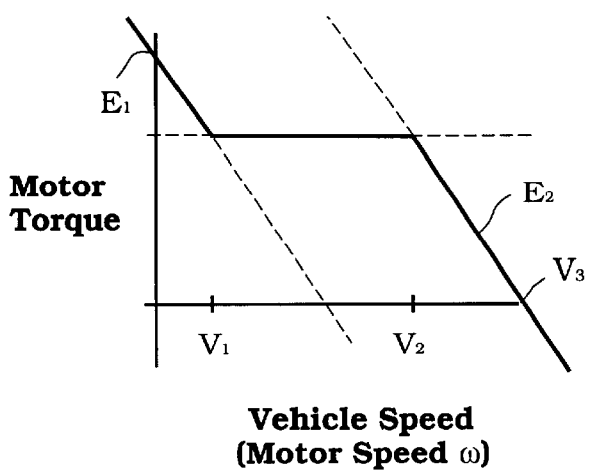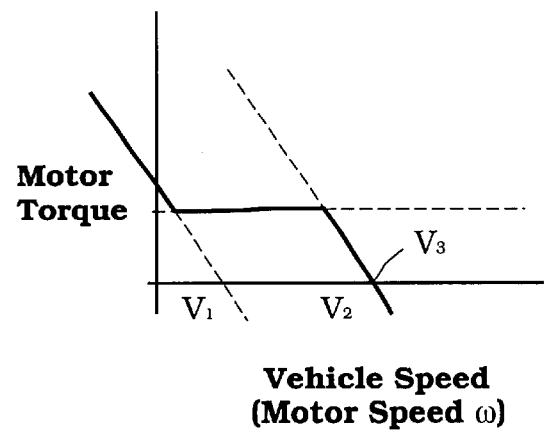
Figure 13                    Figure 14

POWER ASSISTED WHEELCHAIR

BACKGROUND OF THE INVENTION

This invention relates to a power-assisted wheelchair and more particularly to an improved control arrangement therefor.

There have been provided a large number of different types of vehicles that are powered primarily by manual power, but wherein an electric motor assist is provided. The utilization of such electric motor assists permits the use of these types of vehicles by persons who might otherwise not be able to enjoy them. These vehicles can be utilized both for recreational and primary transportation purposes.

One type of vehicle wherein this form of power-assist system is particularly useful is in a wheelchair. By employing a power-assist for a wheelchair, it is possible to permit the user to obtain exercise and still travel substantial distances without assistance from another person.

Generally, one particularly useful way in which the power-assist is provided is that the amount of manual force input is sensed and an assist is provided in proportion to the manual power input. Although this has great utility, there are some areas where the prior art types of construction could be improved.

For example, many times the vehicle may be used by persons having varying strengths and abilities. In addition, at times, the same person may require different degrees of power-assist. For example if the terrain over which the vehicle changes more or less assist may be required. For example if going uphill, more assist may be required. On the other hand, when going down hill less assist is required. Often times these changes in condition may occur suddenly or even unexpectedly. Thus it is desirable to have the capability of having the assist be capable of responding rapidly to changes in conditions.

It is, therefore, a principal objection of this invention to provide an improved electric motor assisted vehicle wherein the system is more responsive to variations in manual input so as to set the appropriate degree of power-assist for the specific individual and specific circumstance.

One particularly sensitive area in connection with the power-assist provided is a potential danger of the vehicle being driven at too great a speed. Although it is possible to utilize speed limiting devices, the desired controlled speed also varies with many conditions. For example, on level ground or when going up a hill the need for speed control is not as great as when going down hill. In some instances it may even be desirable to have the assist system be capable of providing a braking effect.

It is, therefore, a still further object of this invention to provide an improved electric power-assisted vehicle operating system wherein the system will provide automatic braking under certain desired conditions.

However, at times when in a braking or speed controlling mode, conditions may require an abrupt change in assist amount.

It is, therefore, a still further object of this invention to provide an improved electric power-assisted vehicle operating system wherein the system can shift between braking and assist under certain conditions.

Another condition that is particularly important in dealing with power-assist is during changes in operating conditions, as above described. If the assist ratio is fixed so as to be substantially constant for a given individual or condition, then the assist ratio which may be acceptable for normal running may be too low to facilitate start-up or if the load conditions change. This is particularly true if it is necessary when going from the level to traveling up a hill.

It is, therefore, a still further object of this invention to provide an improved electric power-assisted vehicle control wherein the assist ratio is automatically adjusted so as to suit particular running conditions, such as going up hills.

Even when going up or down hills the desired amount of assist may change suddenly. For example if going down hill and the speed is being controlled by utilizing braking operation from the assist motor, the appearance of an unexpected article in the path may require sudden maneuvering. If the assist is being limited or even prevented this is undesirable.

It is, therefore, an object of this invention to provide an improved electric power-assisted vehicle control wherein the assist can be rapidly modified to suit changed conditions.

Generally, the manual torque input sensor for the control of this type of vehicle has a null or dead band range wherein the operator may cause some force application which is not sufficient to initiate operation of the vehicle. Although this type of dead band can be particularly useful in ensuring against the unexpected or sudden application of power-assist when it may not be desired, it can also delay assist operation once the vehicle is in motion.

It is, therefore, a still further object of this invention to provide an improved torque sensing arrangement for an electric power-assisted vehicle wherein the dead band condition can be adjusted, either manually or automatically, so as to provide different degrees of dead band, depending upon the running condition.

Certain of these results can be achieved by having the degree of power-assist vary in relation to the particular speed of travel of the vehicle. For example, it may be desirable to provide a high degree of power-assist when the vehicle speed is low or when first starting up, and then decrease the power-assist as the vehicle speed increases. However, if traveling under certain conditions, for example, when rolling downhill, the vehicle speed may increase, and if the power assist is decreased, then the amount of braking force available for the rider also would decrease.

It is, therefore, a still further object of this invention to provide an improved electric power-assisted vehicle control wherein the variations in the assist ratio can be tailored to provide the optimum degree of power assist under all running conditions.

SUMMARY OF THE INVENTION

Several features of this invention are adapted to be embodied in an electric motor, power assisted wheelchair having a frame assembly providing a seat for accommodating a single rider. A pair of drive wheels are disposed on opposite sides of the seat and have hand wheel portions so that the rider may apply a manual force for turning these drive wheels. In addition, an electric motor is provided that is capable of providing a driving assist force to at least one of the drive wheels for assisting the manual input. A sensor senses the manual force that the rider applies to the hand wheel. A control receives the output from the sensor and provides an amount of electric power assist from the electric motor in relation to the sensed manual input force.

In accordance with a first feature of the invention that is adapted to be embodied in a wheelchair as described above, the vehicle running condition is also sensed, and the amount of power assist provided is varied with each input of manual force and in response to the sensed vehicle running condition.

In accordance with a specific embodiment incorporating the aforenoted feature, a specific amount of assist is provided when the vehicle speed is below a predetermined speed, and the assist decreases when the speed exceeds this predetermined speed.

In accordance with another specific embodiment incorporating the aforenoted feature, a braking effect may be generated when a predetermined speed is exceeded.

In accordance with another specific embodiment incorporating the aforenoted feature, a greater amount of assist is provided when the speed falls below a predetermined speed.

In accordance with another specific embodiment incorporating the aforenoted features, the predetermined speeds are reset with each new application of manual force.

In accordance with still another specific embodiment incorporating the aforenoted features the assist is maintained for a time period after the application of manual input ceases.

Other features of the invention are adapted to be embodied in an electric power assisted, manually propelled vehicle. The vehicle has a propulsion device for propelling the vehicle. A manual input mechanism is provided for applying manual power to the propulsion device for manually powering the vehicle. An electric motor is operatively coupled to the vehicle propulsion device for applying an assist power to the propulsion device. A control senses the manual input force and other conditions for controlling the amount of power-assist provided.

In accordance with a first feature of the invention in connection with an electric power assisted vehicle as described above, if the vehicle speed exceeds a predetermined speed, the power assist is stopped. If the speed exceeds a second predetermined speed higher than the first predetermined speed, a braking force is applied to the vehicle through the electric motor by means of regenerative braking.

In accordance with yet another embodiment of the invention as described in the described type of electric power assisted vehicle, a manual input sensor of the control has a null or dead band condition wherein a predetermined amount of force must be exerted before the electric power-assist is applied. In accordance with this feature of the invention, the null or dead band range is set wider before the vehicle is in motion than during running, so as to decrease the sensitivity. However, once the vehicle is in operation, the width of the null or dead band is decreased, so as to provide quicker response.

BRIEF DESCRIPTION OF THE DRAWINGS

FIGS. 13 and 14 are graphical views showing how the motor torque is varied in response to vehicle speed and operator strength in accordance with an embodiment of the invention.

DETAILED DESCRIPTION OF THE PREFERRED EMBODIMENTS OF THE INVENTION

Figure 1:
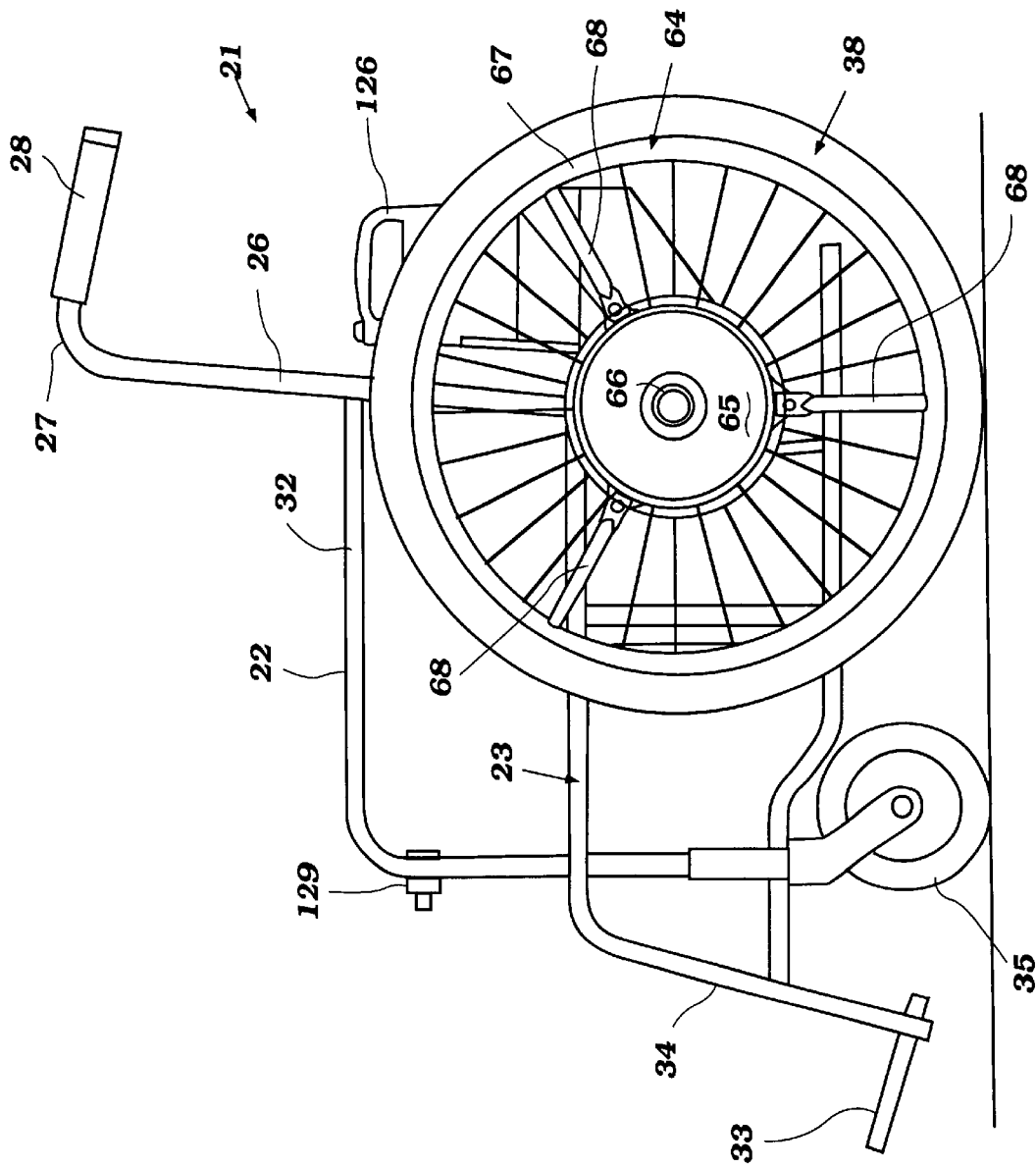
FIG. 1 is a side elevational view of a wheelchair constructed and operated in accordance with an embodiment of the invention.
Figure 2:
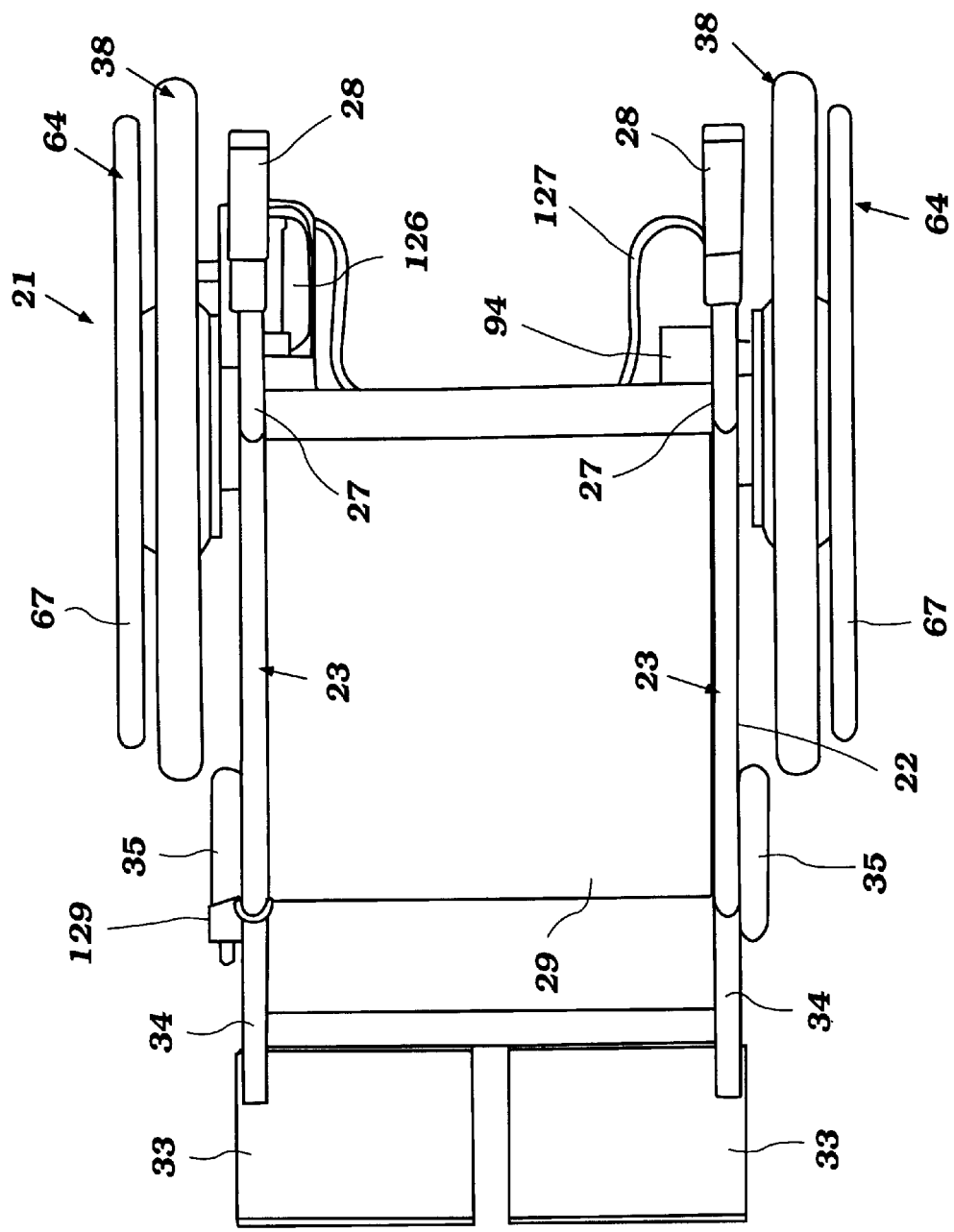
FIG. 2 is a top plan view of the wheelchair.
Figure 3:
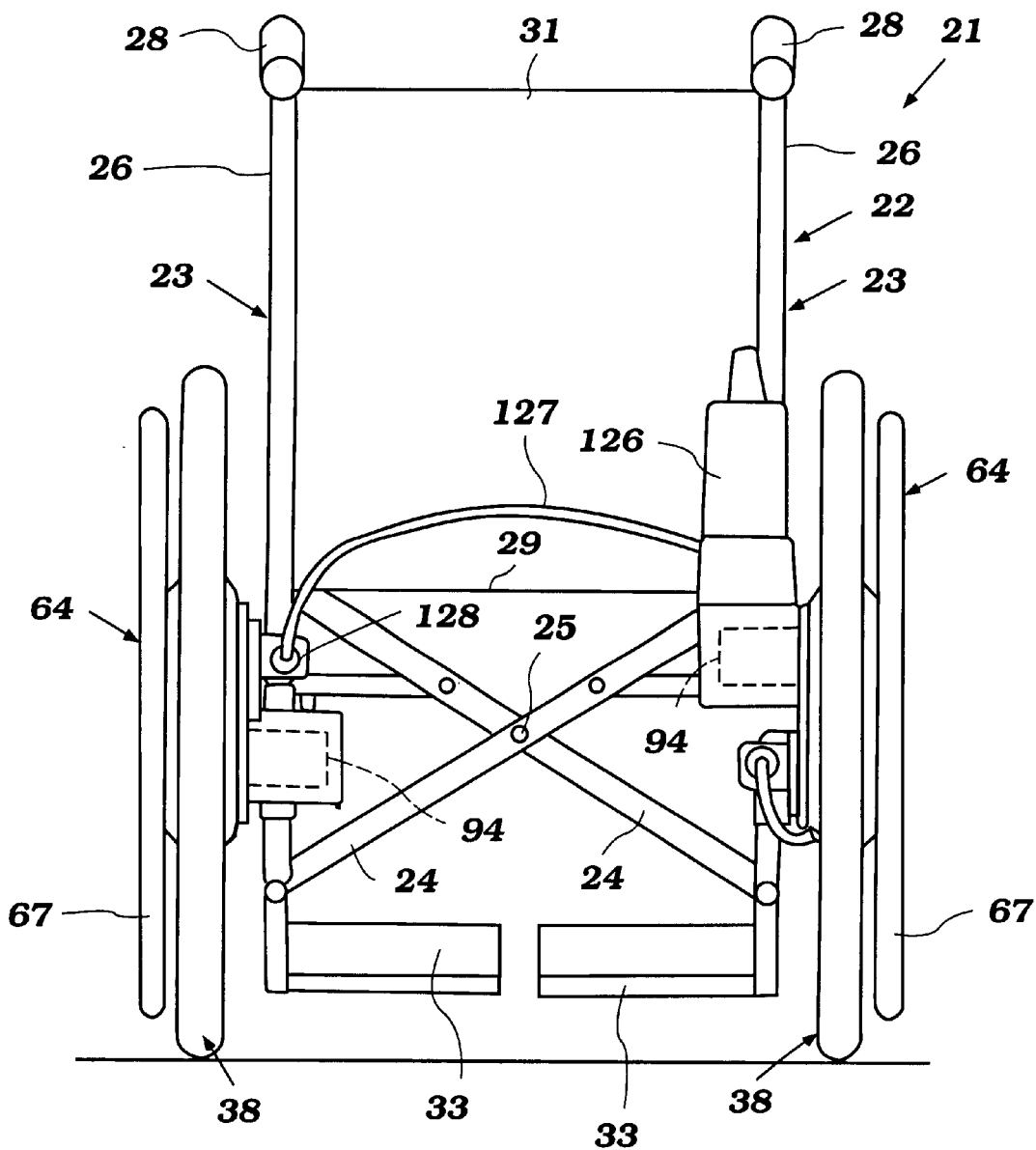
FIG. 3 is a rear elevational view of the wheelchair.

Referring now in detail to the drawings and initially to FIGS. 1–3, a foldable wheelchair constructed in accordance with an embodiment of the invention is identified generally by the reference numeral 21.

The foldable wheelchair 21 is comprised of a folding frame assembly, indicated generally by the reference numeral 22 which is comprised of a pair of tubular side frame members, each indicated by the reference numeral 23 and which have a generally h-shaped configuration in side elevation. These side frame members 23 are connected to each other by a scissors-type linkage system, comprised of a pair of links 24 pivotally connected to each other by a pivot pin 25. There is preferably a rear pair of links at the rear of the side frame members 23 and a front pair of links at the front of the side frame members 23.

The links 24 have pivotal connections at one of their ends to the side frame members 23 and sliding connections at their other ends to the side frame members 23 as is well known in this art. A suitable locking mechanism (not shown) may be provided for holding the side frame members 23 in their extended operative position as shown in the Figures and/or in their retracted storage or transportation position.

Upstanding legs 26 of the side frame members 23 are formed with integral push handles 27 which carry hand grips 28 at their upper ends so that an assistant or helper may push the wheelchair 21.

A canvas seat strap 29 and back strap 31 are connected at their ends to the side frame members 23 and handle portions 26, respectively, so as to accommodate a seated rider. These seat and back portions 29 and 31 are flexible so as to fold upon folding of the wheelchair 21.

Arm rests 32 are formed by horizontal parts of the side frame members 23 so as to support the seated occupant's arms. Foot rests 33 are connected to lower legs 34 of the side frame members 23 so as to accommodate the rider's feet. These foot rests also may be pivotal from their operative positions to storage positions, as is well known in this art.

A pair of front wheels 35 are connected by caster assemblies 36 to a further portion 37 of the side frame members 23 immediately to the rear of the foot rests 33. In addition, large rear wheels 38 are journaled by the side frame members 23 via a detachable connection, in a manner to be described, at the rear of the frame assembly and generally in line with the tubular portions 26.

The construction of the wheelchair 21 as thus far described may be considered to be conventional and as such forms no part of the invention, other than representing the environment in which the invention may be practiced. Therefore, where any component of the wheelchair 21 is not described in detail, any conventional construction may be utilized. Also, from the following description, those skilled in the art will readily understand how the invention may be applied not only to a wide variety of types of wheelchairs, but also that certain aspects may be applied to other types of manually-powered vehicles, both land and water.

Figure 4:
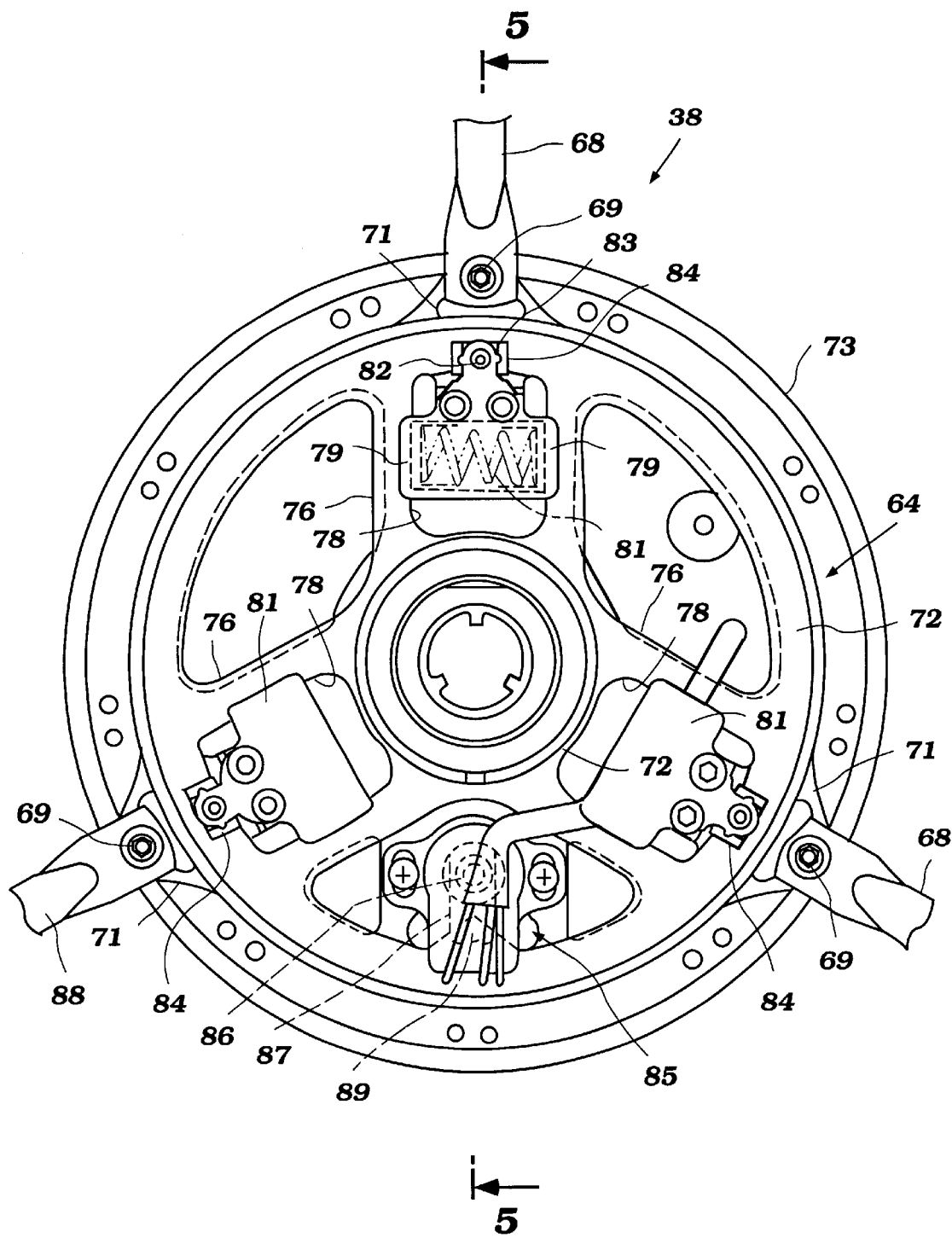
FIG. 4 is a side elevational view of one of the wheels and particularly the torque-sensing arrangement with the cover removed and showing only the hub portion.
Figure 5:
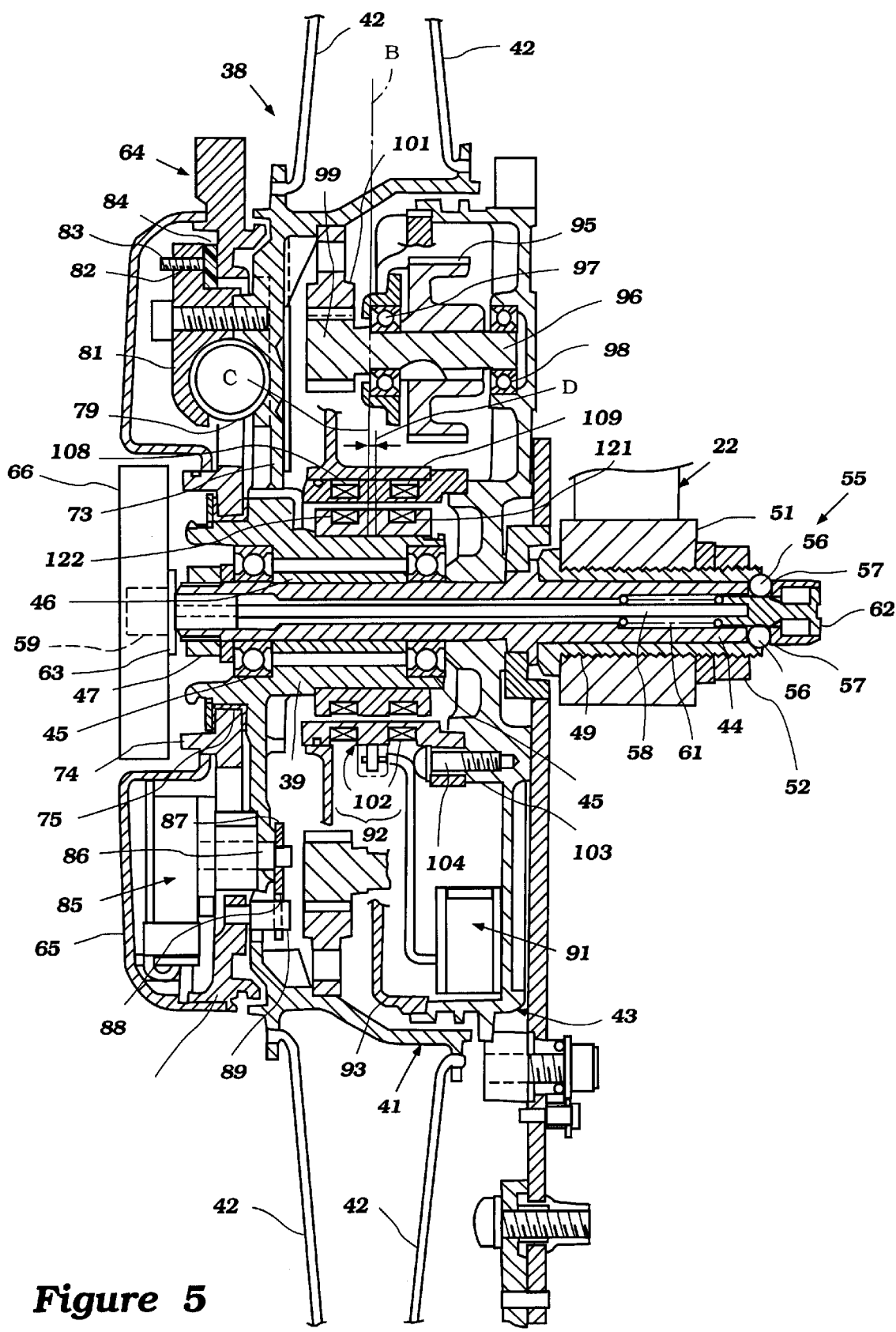
FIG. 5 is a cross-sectional view taken along the line 5—5 of FIG. 4.

The detachable support and journal for the rear wheels 38 and the drive therefor will now be described by primary reference to FIGS. 4 and 5 with the initial description being directed primarily to FIG. 5. Each wheel assembly 38 and the drive therefor has substantially the same configuration except for its orientation as mounted to the frame 22. For that reason, only one wheel will be described.

Each wheel 38 includes a hub portion 39 which is mounted on the frame assembly 22 by a detachable connection that will be described later. This hub portion 39 has an integral outer area 41 to which one end of spokes 42 are laced in any suitable manner. These spokes 42 extend radially outwardly and are connected also by a lacing arrangement to an outer rim that carries a tire.

A backing plate assembly, indicated generally by the reference numeral 43, has a central part that receives a support shaft 44 which support shaft extends into the inner part of the wheel hub 39. Anti-friction bearings 45 rotatably journal the hub 39 on this shaft 44. A sleeve 46 is disposed between the bearings 45 to hold their spaced relationship.

A nut 47 is threaded onto the outer end of the shaft 44 so as to hold the assembly together in an axial direction. The nut 47 in effect holds the backing plate 43 against a shoulder 48 formed on the shaft 44.

On the other side of the shoulder 48, the shaft 44 detacheably extends into a sleeve 49 that is affixed to the frame assembly 22 by a welded boss 51 that receives the sleeve 49 and, accordingly, the shaft 44. The sleeve 49 is held in place axially in the boss 51 by a nut 52.

A detent locking mechanism, indicated generally by the reference numeral 55 is provided for detachably affixing the shaft 44 and, accordingly, the backing plate 43 and wheel 38 to the frame assembly 22. This detent locking mechanism includes a plurality of detent balls 56 that are received in radially extending bores 57 formed in the shaft 44. The shaft 44 is hollow and an actuating pin 58 extends axially through it and has a headed end 59 on the outer side of the wheel 38. This headed end 59 is supported for reciprocation in a counter bore formed in the outer end of the shaft 44. A biasing coil spring 61 is received in the shaft 44 and urges the actuating pin 58 toward the right as shown in FIG. 5.

In this position, an enlargement 62 formed on the opposite end of the pin 58 will engage the balls 56 and urge them outwardly in their recesses 57 to engage the sleeve 49 and, accordingly, lock the wheel 38 and backing plate 43 axially in position. A snap ring 63 is provided on the headed portion 59 so as to limit the movement of the actuating pin 58 to the right under the action of the spring 61.

When the headed portion 59 is pulled to the left against the action of the spring 61, the headed portion 62 will move clear of the balls 56 and they can then recede into their bores 57 so that the wheel 38 and backing plate 43 may be pulled free in one motion, utilizing a minimum effort and no tools.

Any suitable mechanism may be provided order to hold the backing plate 43 against rotation relative to the frame assembly 22.

A hand wheel 64 is carried on the outer side of the wheel 38 in a manner which will be described. This hand wheel 64 includes a cover piece 65 that has a central opening that is aligned with the pin head 59 and into which it extends. An elastic cap 66 is affixed to the pin head 59. By pulling the elastic cap 66, the pin head 59 may be moved to its released position in the manner which has already been described for removal of the wheel 38 and backing plate 43.

The way in which the hand wheel 64 is connected for rotation with the respective wheel 38 will now be described by continued reference primarily to FIGS. 4 and 5. The hand wheel 64 has a circular rim portion 67 (FIGS. 1–3) that is provided with three radially inwardly extending spokes 68 which are formed from a tubular sheet metal construction. The inner ends of these spokes 68 are flattened so as to be affixed by threaded fasteners 69 to lugs 71 of a hub member 72. The hub member 72 is connected to the wheel hub 39 and specifically an annular portion of it 73 by means of a lost motion biasing connection to be described shortly.

The hub member 72 of the hand wheel 64 has a radially inward portion 74 that is journalled upon the wheel hub 39 for limited rotation permitted by the lost motion connection. A plastic bearing 75 is provided for this purpose and to permit smooth operation. The aforenoted lost motion biasing connection is actually comprised of three assemblies that are spaced around the hub portion 73 and in aligned relationship to the spokes 68 that connect the hand rim 67 to its hub 72. The lost motion connections are also utilized to sense the force applied by the rider to the hand rim 64 and are shown best also in FIGS. 4 and 5. It should be noted that the wheel hub 39 and hand rim hub 72 have respective spoke portions 76 that are formed with three circumferentially spaced windows 78. In each of these windows 78, a coil compression spring 79 is positioned. The spring 79 is held axially relative to the wheel assembly 38 by means of spring retainers 81 which extend radially across and span these windows 78.

The lost motion biasing connections are not shown in specific detail in this application because they can be of any type known in this art. For example, reference may be had to our copending application entitled "Electric Power-Assisted Wheelchair," Ser. No. 08/798,279, filed Feb. 14, 1997, and assigned to the assignee hereof, for the details of one type of lost motion device that can be utilized in connection with the invention. Since the invention deals primarily with the control strategy, it is not believed to be necessary to permit those skilled in the art to practice the invention.

The spring retainers 81 also have extending portions 82 that carry adjusting screws 83. These adjusting screws 83 engage plastic bearing members 84 so as to set the clearance between the hand wheel 64, and specifically its hub portion 72 and the hub portion 73 of the wheel 38. This eliminates wobble in the operation of the hand wheel 64 and provides a smoother operation.

Thus, when the rider applies a hand pressure to the hand wheel 64, this will cause the springs 79 to be partially compressed before initial rotation of the wheels 38 occurs.

The amount of the deflection of the spring 79 is an indication of the torque or force applied by the operator to the hand wheel 64.

In order to provide a usable source of information as to the torque or force which the operator has placed on each of the hand rims 67, a potentiometer assembly, indicated generally by the reference numeral 85 is provided. This potentiometer unit 85 outputs a signal that is indicative of the degree of rotation of the hand wheel 64 relative to the main wheel 38. This is in effect, equal to the degree of compression of the springs 79. This potentiometer construction is also shown best in FIGS. 4 and 5 and will be described by reference to those figures.

The potentiometer 85 is comprised of a potentiometer housing that contains a typical type of potentiometer mechanism such as a wound resistor and wiper arm as described also in our aforementioned copending application. The housing is mounted in the wheel hub 73 by a mounting assembly that permits adjustment of the rotary position of the potentiometer for null setting. A shaft 86 of the potentiometer element extends outwardly of the housing and carries a lever arm 87. The lever arm 87, in turn, has a slot 88 that receives a pin 89 affixed to the wheel rim 73. Thus the potentiometer 85 will output a signal indicative of the degree of relative rotation between the hand wheel 64 and the drive wheel 38.

The potentiometer output is transmitted to a controller, indicated generally by the reference numeral 91 through a rotary transmitter indicated generally by the reference numeral 92. The rotary transmitter 92 will be described in more detail shortly by reference to FIGS. 6–9.

The controller 91 is axially displaced from the potentiometer assembly 85 and is mounted in a cavity formed in the backing plate 43 and which is closed by a cover plate 93 so as to effect sealing therebetween.

The output from the controller 91 is transmitted to an electric motor that provides an electric power assist for the transmission, this motor being indicated by the reference numeral 94. The motor 94 drives the wheel 38 through a transmission which is of the type described in our aforenoted copending application. The mounting for the motor 94 for each wheel 38 is also as described therein.

The transmission drive a drive belt (not shown) which in turn, drives a driven pulley 95 which is keyed for rotation to a shaft 96 that is journaled in bearings 97 and 98 carried by the cover plate 93 and backing plate 43, respectively. A gear 99 is formed integrally with the shaft 96 and drives a ring gear 101 that is affixed for rotation with the wheel rim 41 so as to establish a driving relationship therebetween.

As seen in FIG. 3 the motor 94 associated with one of the wheel assemblies 38 is staggered relative to that of the other wheel assembly 38. This permits the motors 94 to nest with each other when the wheelchair 21 is folded. Thus even if the wheel chair 21 is folded with the wheels in place, a compact folded assembly results.

It has been noted that the output signal from the potentiometer 85 is transmitted to the controller 91. Since the potentiometer 85 is mounted for rotation with the hand wheel 64 and, accordingly, with the main wheels 38 and the controller 91 is fixed, the rotary-type connection, indicated by the reference numeral 92, This connection will now be described by reference to FIGS. 5–9.

As has been previously noted, the information from the potentiometer 85 is transmitted to the controller 91 through the rotary transmitter 92. The construction of this transmitter 92 will now be described by particular reference to FIGS. 5–9.

The rotary transmitter 92 includes an outer, fixed member 102 that is affixed to a hub portion 103 of the backing plate 43 by threaded fasteners 104. This outer member 102 is the non-rotatable portion of the transmitter 92 and carries contacts that conductors 105 are connected to, to transmit information between from the potentiometer 85 to the controller 91.

The member 102 is formed from a core 106 that is formed from a non-ferromagnetic material, such as an insulating plastic. Its outer surface is provided with a pair of grooves 107 and 108 that receive respective windings 109 and 111. These windings are connected to the conductors 105 so as to transmit the receive signal from the potentiometer 85 to the controller 91.

Figure 6:
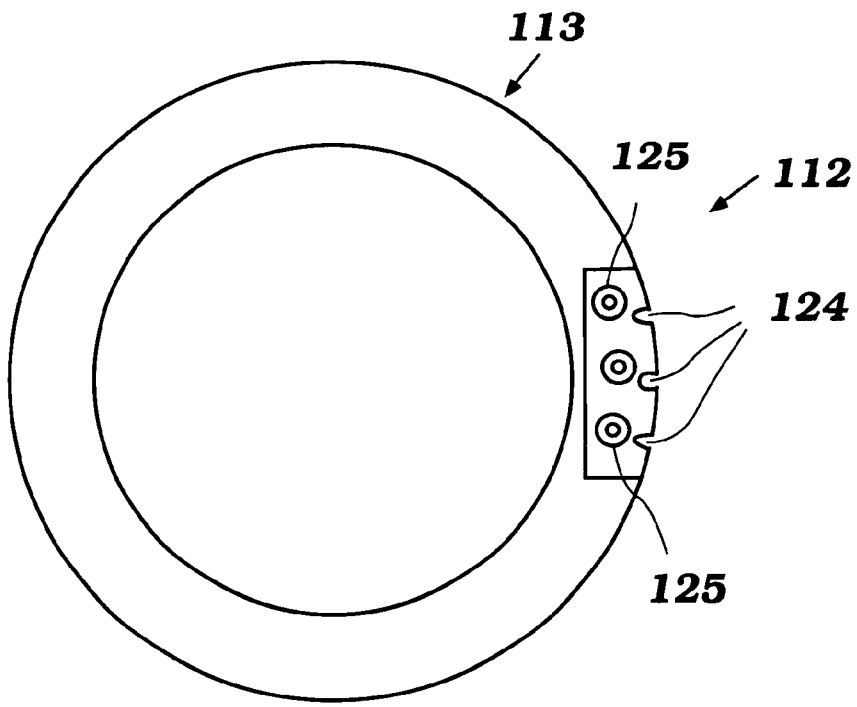
FIG. 6 is a side elevational view of the signal transmitter employed in the control system.
Figure 7:
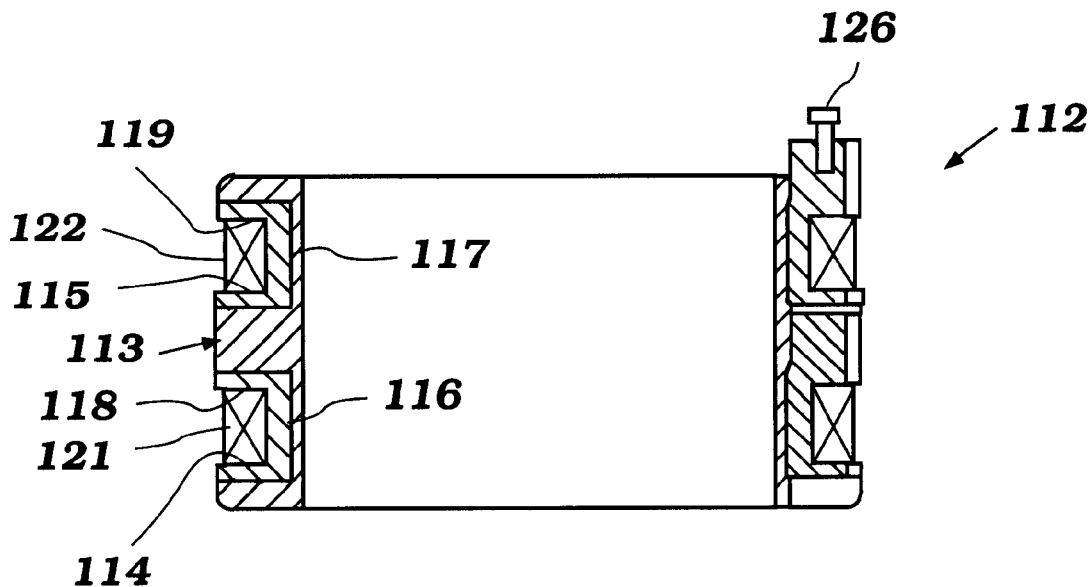
FIG. 7 is a cross-sectional view, taken through the signal transmitter as shown in FIG. 6.
Figure 8:
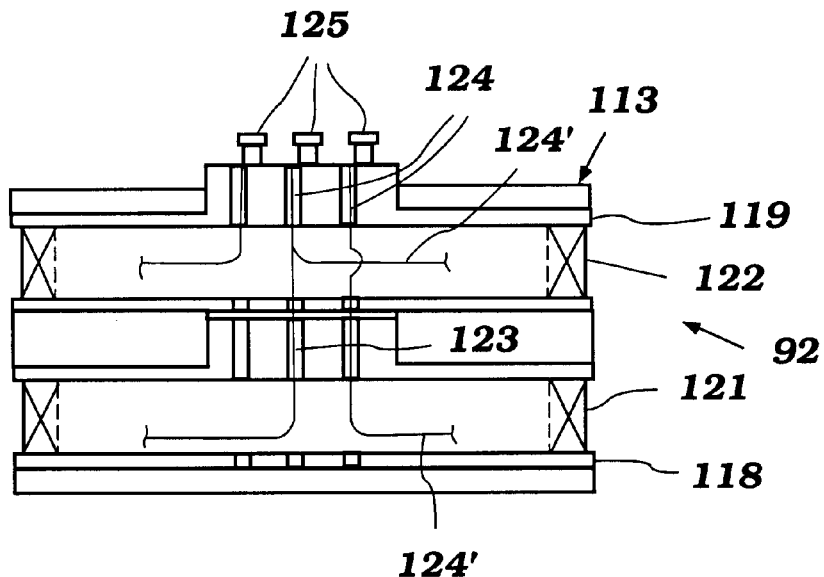
FIG. 8 is a top plan view of the signal transmitter.
Figure 9:
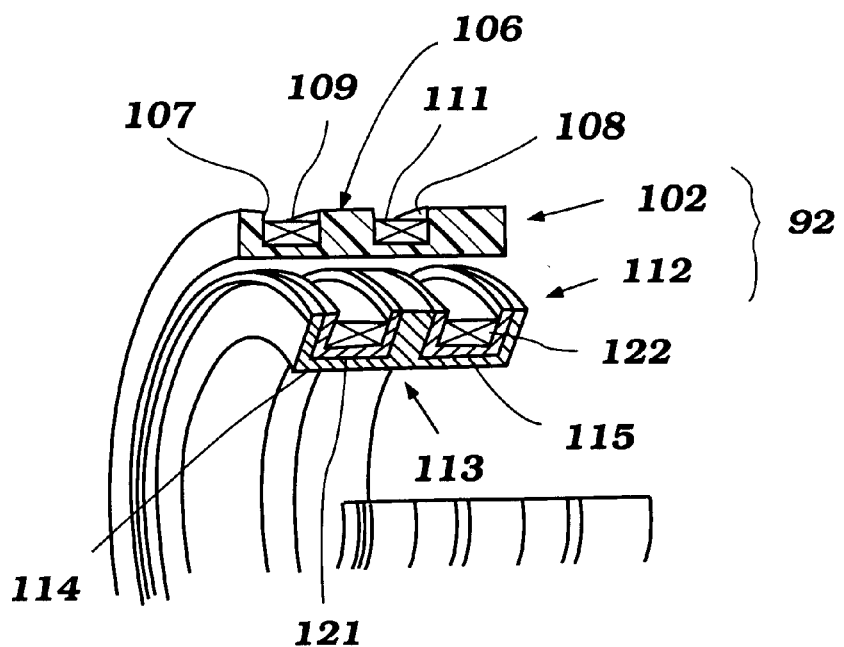
FIG. 9 is a broken-away perspective view of the signal transmitter, showing the relationship of the two components thereof.

There is further provided a rotatable inner member 112 which is shown in most detail in FIGS. 6–8 and which is affixed to the hub 39 of the wheel rim 41. The inner member 112 is comprised of a cylindrical hub 113 formed of a ferromagnetic material, such as mild steel. Its outer surface is provided with a pair of grooves 114 and 115.

Received in the grooves 114 and 115 are a pair of windings each having its own respective core portion 116 and 117 that define their own grooves 118 and 119 that receive respective windings 121 and 122.

It will be seen that the outer periphery of the member 113 is formed with a plurality of circumferentially spaced slots 123 so as to pass the terminal ends 124 of the of the coil windings 121 and 122 for their attachment to respective terminals 125. These terminals 125 provide the electrical connection to the potentiometer so that its signal will be transmitted to the outer member 102 for transmission to the controller 91, as aforenoted. These also function to provide an electrical potential to the potentiometer 85 so as to permit measurement of the varying resistance of it.

It has been noted that the core 106 of the outer member 102 is formed from a plastic and hence non-ferromagnetic material. Because of the external metallic parts and the fact that the cores 106 and 113 are affixed to the hub portions 103 and 39, respectively, it is desirable to restrict magnetic imbalance caused by these external parts.

Thus, it is desirable to keep the magnetic distance between the winding 109 to the wheel hub base portion 73 and the distance between the winding 122 and the backing plate center portion 103 substantially equal. Thus, the center of the outer member 102, indicated by the point D, is offset by a dimension C relative to the axis B of the wheel rim 41. It would be ideal to place the outer member 91 directly on the wheel center B, but then this would result in an undesirable increase in the distance between the winding 111 and the backing plate portion 103.

Referring again to FIGS. 1–3, for simplicity and cost reduction purposes only a single battery, indicated generally by the reference numeral 126, is carried adjacent the right-hand wheel 38. An electrical cable 127 and connector 128 connect this battery 126 to the controller 91 associated with the left-hand wheel 38. Also, a main switch 129 (FIG. 1) is disposed on one of the arm rests 32 for activating or deactivating the entire control system.

The control units 91 associated with the right and left hand wheels 38 interchange information with each other. This is done so as to compensate for the possible difference in strength between the rider's right and left arms. As is well known, nearly all individuals, be they healthy or physically challenged, have different strengths in each arm. Therefore and as is noted in our aforenoted copending application, the control system, to be described shortly by reference to FIGS.

10–14, provides compensation to ensure that if the rider is exerting his maximum force with each arm, that the wheelchair 21 will travel in a straight rather than a curved path.

In other words, the control system compensates for these unequal arm strengths so as to ensure that the rider can use his maximum strength on each wheel without causing the wheelchair 21 to travel in a nonlinear path. Because this system is described fully in the aforenoted copending application, the disclosure of which is incorporated herein by reference, further description of this portion of the system is not believed to be necessary to understand the invention. However, certain portions of this will be described in order to understand the features which are added to that control strategy by this invention.

Figure 10:
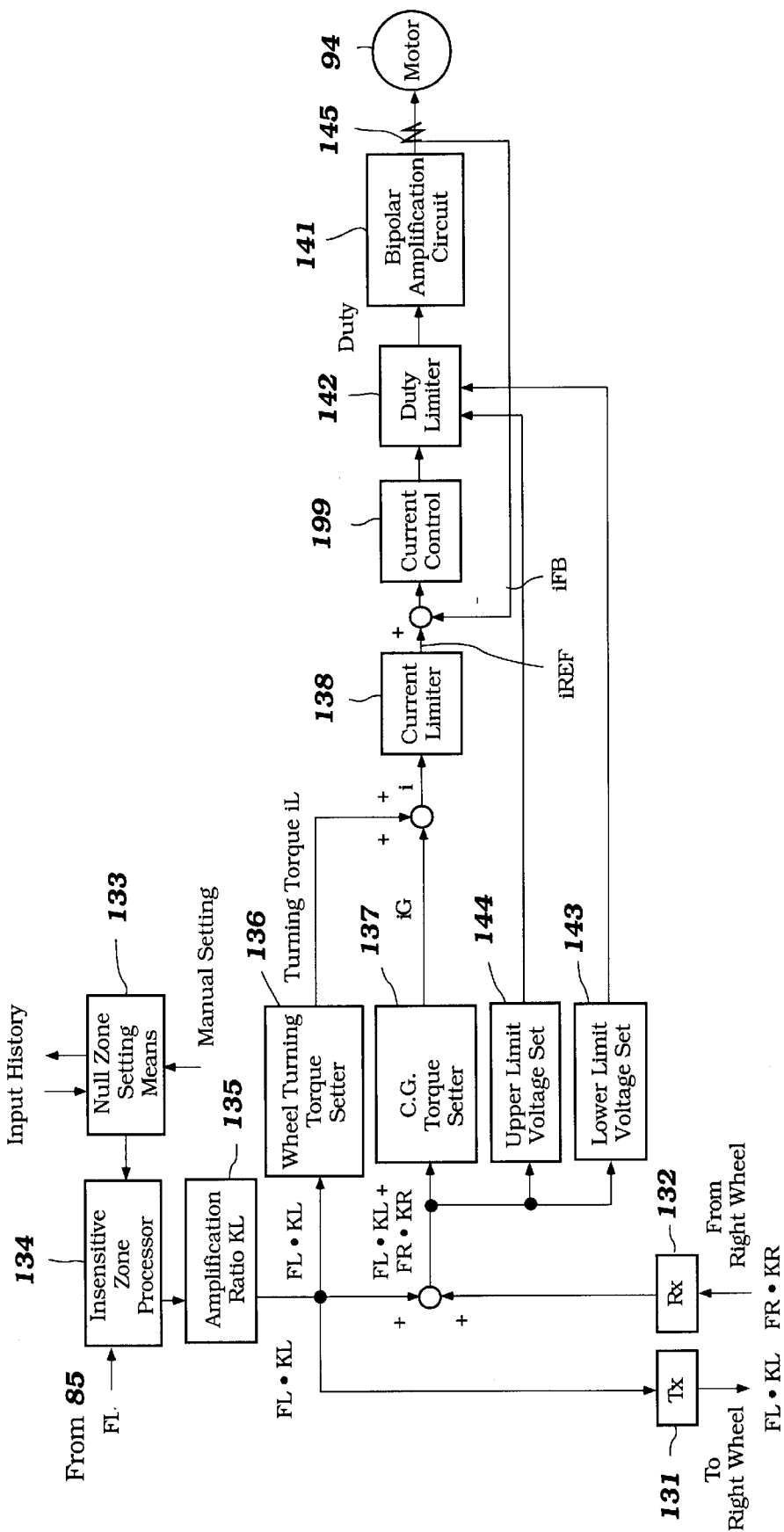
FIG. 10 is a graphical view showing the components associated with one of the wheels and depicting a control system constructed in accordance with a first embodiment of the invention.

Referring now primarily initially to FIG. 10, a first embodiment of the invention is illustrated. The first thing to be noted is that there is illustrated the control for the left hand wheel. Therefore, there is a transmission section, indicated generally by the reference numeral 131, that transmits an output signal to the right wheel controller and a receiver, indicated by the reference numeral 132, that receives information from the right wheel controller. These signals are not the actual torque signals applied to each wheel, as will be noted below.

Figure 11:
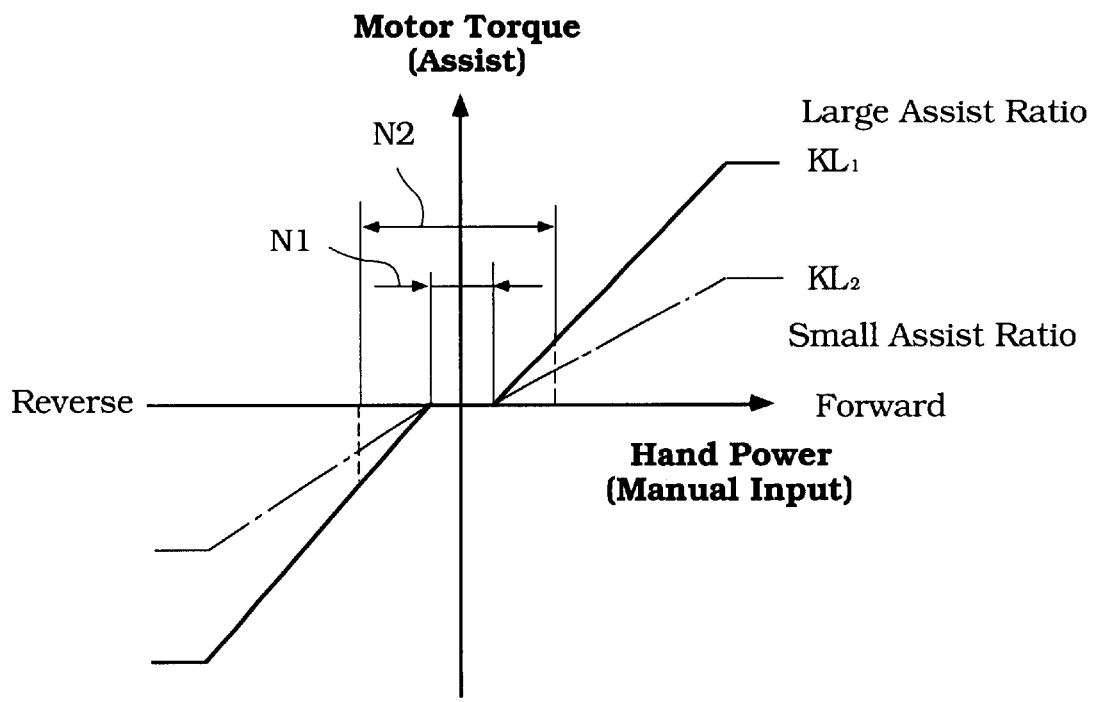
FIG. 11 is a graphical view showing the null band condition of the sensor and the varying assist ratios that can be employed.

As has been previously noted, the potentiometer construction by which the potentiometer 86 is operated and the interconnecting linkage provides a null or dead zone wherein there is no actual output signal. This null zone is indicated in FIG. 11 where there are a pair of amplification curves shows in solid and broken lines. These amplification zones have a mechanical dead band area, indicated at N1, which is basically the null zone that exists due to the mechanical system.

However, in accordance with an important feature of the invention, there is set another null zone N2 wherein the potentiometer may, in fact, output a signal but wherein no assist power is generated. The reason this is done is to avoid a sudden application of power on start-up when the rider may not necessarily desire to have the wheelchair move. That is, the rider's hand force on the hand wheel 64 may actually be in a positive or negative value, but the rider may not actually wish to have the wheelchair move. Thus, for initial start-up operation, an artificial null zone N2 which is wider than the normal mechanical null zone is set.

This null zone N2 may be set either manually through a manual input to a null zone setting device, indicated at 133, or alternatively, may be based upon a history of the particular rider's input conditions. However, once the wheelchair 21 is in motion, then the narrower null zone N1, which may in fact be the mechanical null area, is adopted so that the rider need not utilize as much force for continued motion in either the forward or reverse direction.

Hence, the setting device 133 outputs a signal to an insensitive zone processor 134 which sets the values N1 and N2, respectively. As has been noted, this can be done either through manual input or through observed history.

Thus, the signal transmitted to the controller 91 from the potentiometer 85 is handled in an insensitive zone processing section 134 which senses the respective force input from the operator to the hand wheel 64, indicated at FL, and if this exceeds the null zone which has been set, either N1 or N2, the force signal is transmitted to an amplification ratio setting section 135 for each manual input force stroke applied to the hand wheels 64. This amplification ratio setting section 135 sets a target amplification ratio KL for the respective wheel based upon the sensed input force and which ratio is reset each new time a manual force is input.

FIG. 11 shows various amplification ratios with a large amplification ratio being indicated at $KL_1$, and a smaller amplification ratio being indicated at $KL_2$. In the illustrated embodiment, the amplification ratios for forward and reverse motion are the same, but they can be tailored to be different. Also, the illustrated embodiment shows uniform assist ratios up to a certain point wherein the assist ratio is then held constant. As will become apparent as this description proceeds, other embodiments are also possible.

Thus, at the output from the section 135, there is outputted a signal indicating the initial target assist power torque, indicated at FL×KL. This signal is transmitted to a junction where the information is transmitted to the right-hand wheel by the transmitter 131 and also is transmitted to a section 136 which sets the desired wheel turning torque iL.

In addition, there is also transmitted the same amplified, desired motor torque signal to a summing section which sums the value FL×KL with the corresponding signal from the right-hand wheel FR×KR.

This sum is outputted to a unit or section 137 that applies a compensating factor to the turning torque so as to compensate for the inequality in the rider's arms, as noted in the aforenoted copending application. This may be referred to as a "center of gravity" setting device, and is intended to ensure that the wheelchair will travel in a straight direction when that is the rider's intent. As noted, this is based upon a compensating factor determined by the different strengths in the rider's left and right arms. This outputs a center-of-gravity torque iG.

Thereafter, the signals iG and iL are summed at a summing section. This summed signal is then transmitted to a current limiter section, indicated at 138. At this point, it should be noted that the control operates on the basis that there is a constant voltage applied to the motor, and the motor output to vary its assists is done by a current control loop. Other forms of control may obviously be used, depending upon the type of electric motor chosen.

The current limiter 138 outputs a reference current iREF. This is compared with the actual current flowing at the time iFB as sensed by a motor current sensor 145 and the thus modified signal is transmitted to the current control circuit 139. With a conventional type system as aforedescribed, this output is then transmitted to a bipolar amplification circuit 141 which then controls the electric motor 94.

However, in accordance with this invention, there is provided a further control for limiting or controlling the amount of power supplied to the wheelchair by the electric motors 94. In this embodiment, that is done by setting certain voltages which are indicative of certain instantaneous speeds of rotation of the respective motors 94 and, accordingly, rotational speed of the wheels 38, and by virtue of that, the forward speed of the wheelchair 21.

Thus, there is interposed between the current control section 139 and the bipolar amplification circuit 141 a duty limiter section 142 which controls the actual current supplied to the motor in a matter which will now be described by reference first to FIGS. 13 and 14, and then back to FIG. 10 wherein the way in which the values cooperate with the control will be described. The basic control sets a lower speed range below a predetermined low vehicle speed or motor voltage V1 where a gradually decreasing assist amount is provided shown by the portion E1 which is controlled by a lower voltage limit sensor 143.

When the actual vehicle speed is between the speeds V1 and V2, the reference current is maintained at the value iREF and the assist amount is constant.

However, upon the actual vehicle speed reaching the higher speed V2, then the upper voltage limit setter 144 sets a lower and decreasing effective motor assist E2 which at the actual vehicle velocity V3 becomes negative. This is done so as to not only limit the speed, but also to provide a braking if the speed V3 is exceeded. Thus, even if the vehicle is traveling down a hill, a regenerative breaking will be created which will cause the vehicle to decelerate.

Each time a manual force is input the values E1, iREF and E2 are reset. Generally the greater the manual force that is exerted the higher the values. Thus FIG. 13 shows representative values for high manual input forces while FIG. 14 shows those for lower manual input forces. Thus for higher loads, for example when climbing hills, more assist is provided.

In addition to resetting the values E1, iREF and E2 each time a new manual force is input, the values V1, V2 and V3 are also reset. Basically these values are also set lower for lower manual input forces as also shown by a comparison of FIGS. 13 and 14.

As noted the pair of voltage limit setting devices, indicated generally by the reference numerals 143 and 144 function to provide the different effective assist amounts.

In addition to the resetting of the aforenoted values with each application of a manual input force, the system also operates so that, after the operator discontinues application of manual force to the hand rims 64, the speed is maintained at the existing speed by retaining the previous amount of assist from the motors 94 for a certain time period and then the assist is gradually reduced so the speed gradually is permitted to decay unless a new manual force is input.

Figure 12:
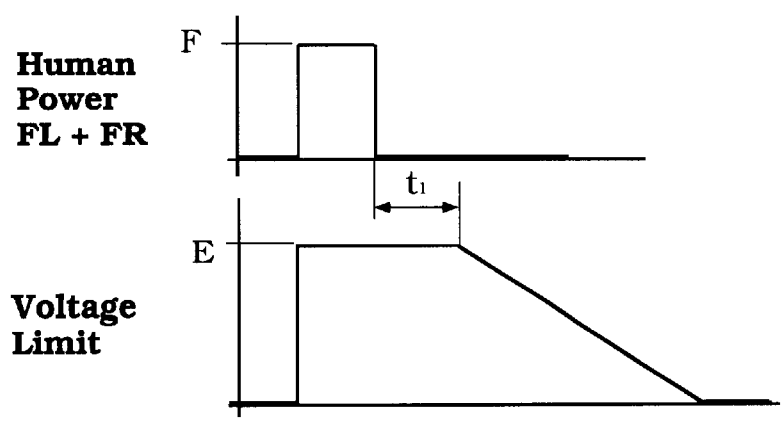
FIG. 12 is a graphical view showing how the power-assist is maintained for a time period after the cessation of application of human power and then gradually decays.

The way this is done is by maintaining the speed of the wheelchair at the existent state once the human power is released. This is done for a fixed time period t1 after which the assist values are gradually reduced over a time period. This condition is shown in FIG. 12. For a time period $t_1$ the assist is maintained at the limit which existed beforehand. Thereafter the values V1, V2 and V3 as well as E2 and E1 gradually decay. Thus, as time goes on and if no new manual force is inputted, the values E1, E2 and iREF gradually decay. In addition, the values of the predetermined vehicle speeds V1, V2 and V3 also gradually decay. This characteristic is particularly significant not only in permitting the vehicle to coast to halt in a normal state when traveling on the level but also obtains a similar characteristic even going downhill.

This may be explained by considering the fact that as the speed V3 decreases with the decay in its value, a regenerative braking will be achieved even going downhill because this newly reset speed will be reached at a sooner point. Thus, regenerative braking will occur and the acceleration of the wheelchair will be avoided. If only the iREF amount was permitted to decay, then the coasting speed could be too high because of the acceleration by gravity. Thus, by lowering the upper speed limit V3, it is possible to ensure that the wheelchair will not overspeed when manual force is released and the wheelchair is on a downhill run.

On the other hand, if traveling downhill and a obstacle is encountered, the rider will place a force on the hand wheel so as to avoid the obstacle. This will set a new set of values in response to the operator input and thus, the loss of control is avoided.

On the other hand, if the situation occurs that the rider is going uphill, then when the vehicle speed falls to the speed V1, some assist power will be generated and thus, the wheel chair will be prevented from rolling backward even during a period when there is no application of manual force to the hand wheels.

Figure 15:
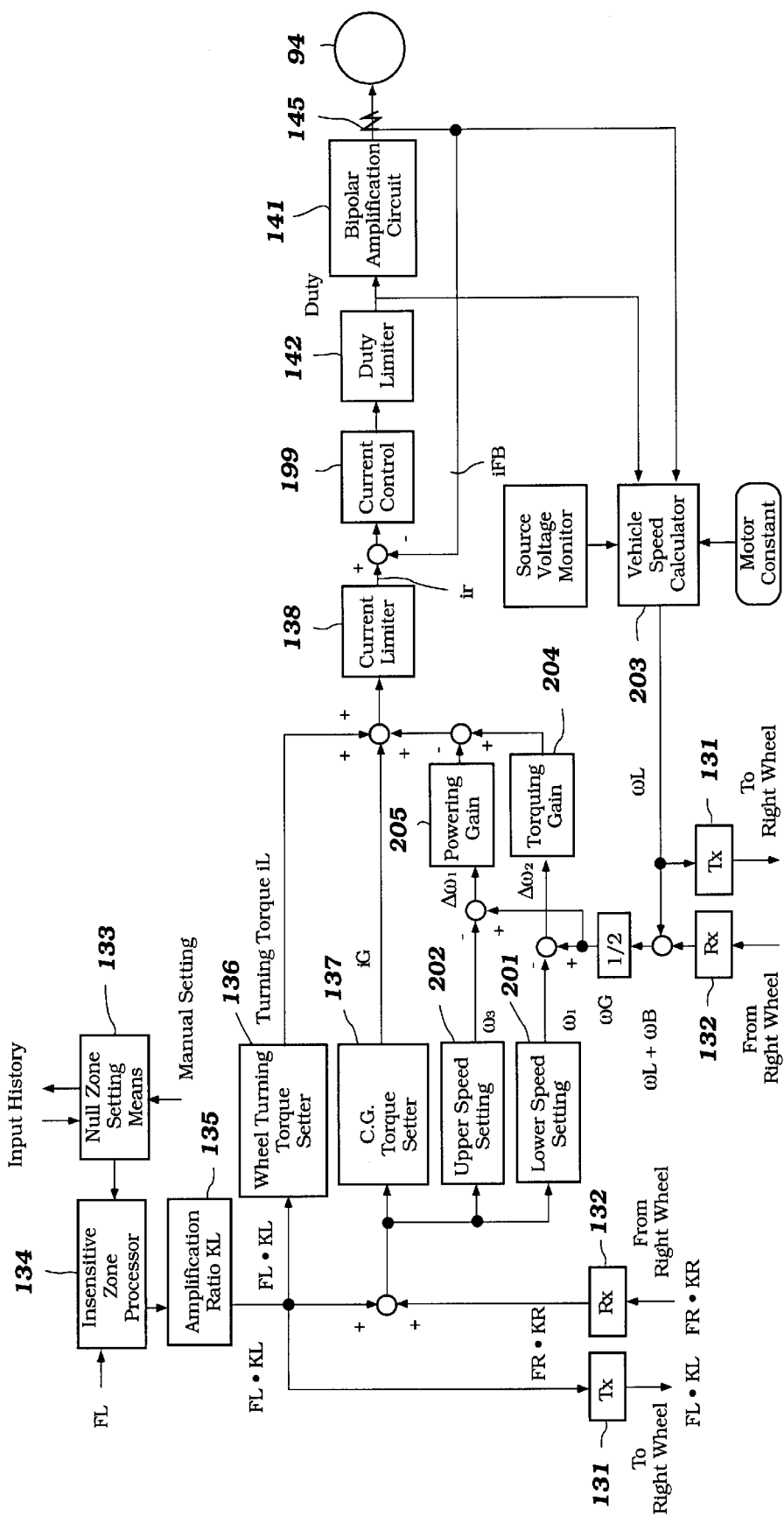
FIG. 15 is a schematic view, in part similar to FIG. 10, and shows another embodiment of the invention.

In the embodiment as thus far described, the assist power amount was controlled by limiting the upper voltage limit E1 and the lower voltage limit E2. As a result, it was possible to control or limit vehicle speed at the high range. However, it is also possible to obtain this control by setting actual speed limits and this can be done by utilizing wheel speed sensors. FIG. 15 shows such an embodiment. This embodiment is quite similar to the embodiment previously described. However, in this embodiment, a lower speed setting device 211 and an upper speed setting device 212 outputs motor speed signals $\overline{\omega}1$ and $\overline{\omega}3$ which are indicative of the previously mentioned vehicle speeds V1 and V3.

The current sensor 145 outputs a signal to a vehicle speed calculator section 203 which also receives information from a source voltage monitor and a motor constant which indicates speed relative to current to output an actual wheel speed signal.

This wheel speed signal is indicated at $\overline{\omega}L$ and is transmitted to the same communicators 131 and 132 that exchange information to and from the right wheel, again indicated by the reference numerals 131 and 132. In a like manner, the wheel speed signal $\overline{\omega}R$ from the right wheel is summed and then sent to a divider that takes the average wheel speed $\overline{\omega}G$ and transmits this information to the output from the lower and upper speed sensors 201 and 202.

The differential speed between the sensed speed and the upper and lower limits are then transmitted to power gain circuits 204 and 205, respectively. Then, if the vehicle speed is outside of the two aforenoted limits, the power and gain circuit either 204 or 205 will send the appropriate signal to the junction to be summed with the output of the center of gravity to the other torque outputs to adjust the called for torque so as to provide the type of assist curves as shown in FIGS. 13 and 14.

Like the previous embodiment, once the rider ceases the manual input of force the motor assist will be maintained for the time t1 and then gradually decay. In this case, however, the speed at the time of cessation of the manual force will be maintained. After the time t1, the speed will be permitted to decay. Again, however, these various values are reset each time a new manual force is input.

Figure 16:
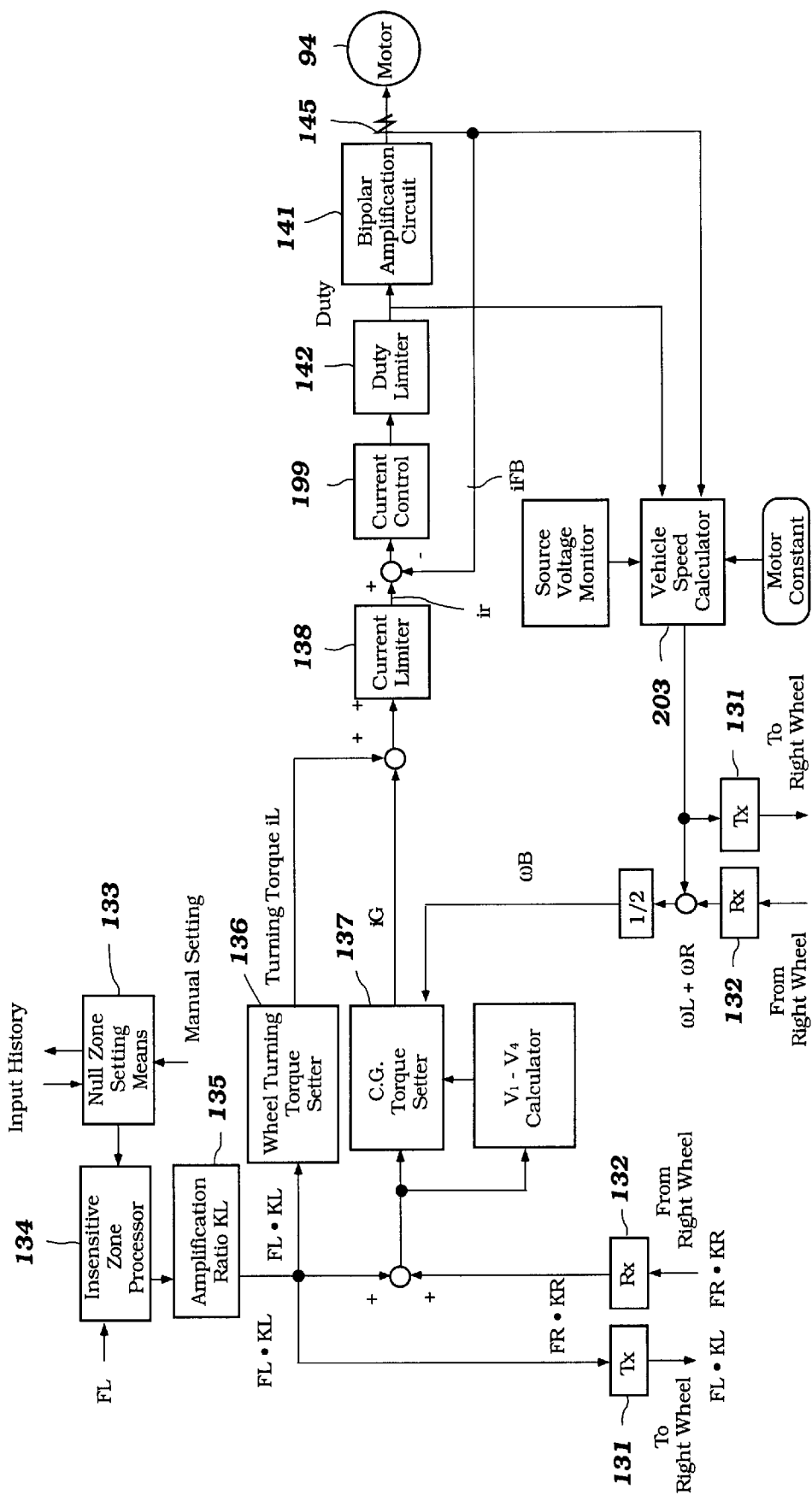
FIG. 16 is a schematic view, in part similar to FIGS. 10 and 15, and shows yet another embodiment of the invention.
Figure 17:
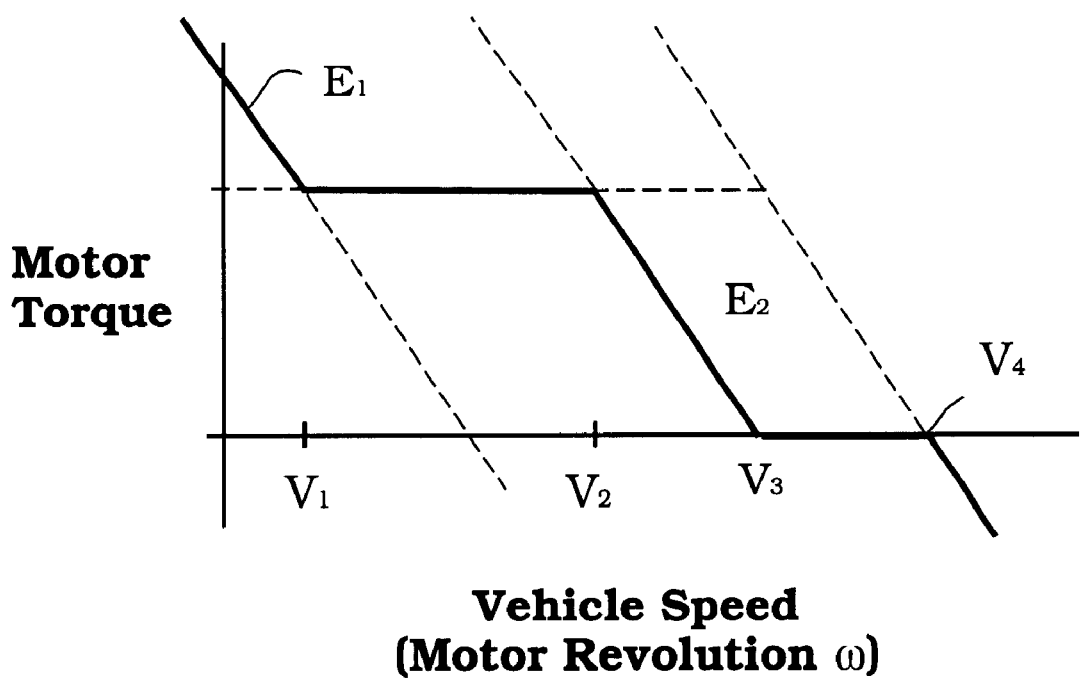
FIG. 17 is a graphical view showing how the motor torque is varied in response to engine speed in accordance with this other embodiment of the invention.

In the embodiments thus far described, the motor torque assist has been increased when the speed was below a preset relatively low vehicle speed V1, was held constant between that speed and a higher speed V2 and then was reduced at that speed and passed over to a breaking force at a higher speed V3. FIGS. 16 and 17 show yet another embodiment of the invention wherein the braking effect is not added until a speed higher than the speed V3 is attained.

That is, this system operates so as to reduce the torque assist at the speed V2 to a point at the speed V3 where there is no motor assist. However, at a higher speed V4, then the braking force is exerted by using the motor for regenerative braking. The slope of this braking curve V3 can be the same as the slope of the curve V2 or different, depending upon the desired results.

In this embodiment, the components are the same as the previously described embodiment of FIG. 15. However, in this embodiment, the upper and lower speed setting means 201 and 202 are replaced by a single calculating section, indicated at 251 which calculates the speeds V1, V2, V3, and V4 and outputs this signal to the center of gravity components setter where the actual adjustments in the center of gravity assist are processed. Thus, this system is somewhat simpler than the other and it makes it possible to set the various speeds as desired. This embodiment also utilizes the decaying assist logic as previously described.

In all of the embodiments as described the values V1, V2, V3 and V4 have been reset in response to changed human input torque. It is also possible to hold these values fixed and only vary the other values.

Thus, from the foregoing descriptions, it should be readily apparent that the described embodiments provide a very effective motor control for an electric power-assisted vehicle that will provide the required assist torque in response to changed running conditions and prevent over speed even when going down hill. Of course, the foregoing description is that of preferred embodiments of the invention and various changes and modifications may be made without departing from the spirit and scope of the invention, as defined by the appended claims.

What is claimed is:

1. An electric motor, power assisted wheelchair having a frame assembly providing a seat for accommodating a single rider, a pair of drive wheels disposed on opposite sides of said seat and having hand wheel portions for application of a manual force by a rider for turning said drive wheels, an electric motor for providing a diving assist force to at least one of said drive wheels for assisting manual force input, a source of electrical power for said electric motor, a force sensor for sensing manual force input from the rider to said hand wheel, a control for receiving an output from said force sensor and controlling the amount of electric power transmitted from said source of electrical power to control the amount of power-assist from said electric motor in relation to the sensed manual force input, means for sensing a wheelchair running condition and means in said control for varying the amount of electric power transmitted from said source of electrical power to control the amount of power assist provided by said electric motor in response to the sensed wheelchair running condition.

2. An electric motor, power assisted wheelchair as set forth in claim 1, wherein the sensed wheelchair running condition is speed.

3. An electric motor, power assisted wheelchair as set forth in claim 2, wherein the amount of power assist is increased when the speed falls below a predetermined low speed.

4. An electric motor, power assisted wheelchair as set forth in claim 3, wherein the value of the predetermined low speed is set in proportion to the amount of manual input force.

5. An electric motor, power assisted wheelchair as set forth in claim 2, wherein the amount of power assist is decreased when the speed is above a predetermined high speed.

6. An electric motor, power assisted wheelchair as set forth in claim 5, wherein the value of the predetermined high speed is set in proportion to the amount of manual input force.

7. An electric motor, power assisted wheelchair as set forth in claim 2, wherein the power assist is converted into a regenerative braking when the vehicle speed exceeds a predetermined high speed.

8. An electric motor, power assisted wheelchair as set forth in claim 7, wherein the value of the predetermined high speed is set in proportion to the amount of manual input force.

9. An electric motor, power assisted wheelchair as set forth in claim 2, wherein the amount of power assist is maintained at a constant value between a predetermined low speed and a predetermined higher speed.

10. An electric motor, power assisted wheelchair as set forth in claim 9, wherein the amount of power assist is increased when the speed falls below a predetermined low speed.

11. An electric motor, power assisted wheelchair as set forth in claim 10, wherein the value of the predetermined low speed is set in proportion to the amount of manual input force.

12. An electric motor, power assisted wheelchair as set forth in claim 9, wherein the amount of power assist is decreased when the speed is above a predetermined high speed.

13. An electric motor, power assisted wheelchair as set forth in claim 12, wherein the value of the predetermined high speed is set in proportion to the amount of manual input force.

14. An electric motor, power assisted wheelchair as set forth in claim 9, wherein the power assist is converted into a regenerative braking when the vehicle speed exceeds a predetermined high speed.

15. An electric motor, power assisted wheelchair as set forth in claim 14, wherein the value of the predetermined high speed is set in proportion to the amount of manual input force.

16. An electric motor, power assisted wheelchair as set forth in claim 6, wherein the amount of power assist is increased when the speed is below the predetermined low speed and is decreased when the speed is above the predetermined high speed and wherein a regenerative braking is provided when the speed exceeds a predetermined second high speed which is higher than the first-mentioned predetermined high speed.

17. An electric motor, power assisted wheelchair as set forth in claim 16, wherein at least one of the predetermined speeds is set in proportion to the amount of manual input force.

18. An electric motor, power assisted wheelchair as set forth in claim 1, wherein the control adjusts the amount of assist also in response to the amount of manual force input each time a manual force is input.

19. An electric motor, power assisted wheelchair as set forth in claim 18, wherein a lesser amount of power assist is provided for a lower manual input force than for a greater input force.

20. An electric motor, power assisted wheelchair as set forth in claim 1, wherein the amount of assist is continued at the same value for a predetermined time when the manual force input ceases.

21. An electric motor, power assisted wheelchair as set forth in claim 20, wherein the amount of assist is set at a value related to wheelchair speed and the amount of power assist is increased when the speed is below a predetermined low speed and is decreased when the speed is above a predetermined high speed.

22. An electric motor, power assisted wheelchair as set forth in claim 21, wherein the amount of assist is set at a value related to wheelchair speed and the amount of assist is permitted to decay after the predetermined time if no new manual force is input.

23. An electric motor, power assisted wheelchair as set forth in claim 22, wherein at least one of the predetermined speeds is also permitted to decay after the predetermined time if no new manual force is input.

24. An electric motor, power assisted wheelchair as set forth in claim 23, wherein both of the predetermined low and high speeds is also permitted to decay after the predetermined time if no new manual force is input.

25. An electric motor, power assisted wheelchair as set forth in claim 22, wherein the power assist is converted into a regenerative braking when the vehicle speed exceeds a predetermined high speed.

26. An electric motor, power assisted wheelchair as set forth in claim 25, wherein the predetermined high speed is the same as the predetermined high speed specified in claim 21.

27. An electric motor, power assisted wheelchair as set forth in claim 25, wherein the predetermined high speed specified in claim 25 is higher than the predetermined high speed specified in claim 21.

28. An electric motor, power assisted wheelchair as set forth in claim 25, wherein the predetermined high speed is also permitted to decay after the predetermined time if no new manual force is input.

29. An electric motor, power assisted wheelchair as set forth in claim 1, wherein the force sensor and the control operate to provide a null range wherein the power assist is not initiated until the manual force applied exceeds the null range.

30. An electric motor, power assisted wheelchair as set forth in claim 29, further including means for adjusting the null range in response to a sensed condition.

31. An electric motor, power assisted wheelchair as set forth in claim 30, wherein the sensed condition is the startup of the wheelchair.

32. An electric motor, power assisted wheelchair as set forth in claim 31, wherein the null range is set wider upon startup than during continued running.

33. An electric motor, power assisted wheelchair as set forth in claim 30, wherein the null range is adjusted based upon a history of the manual power inputs.

34. An electric motor, power assisted wheelchair as set forth in claim 1, wherein the vehicle speed is maintained at a value when the application of manual force is discontinued.

35. An electric motor, power assisted wheelchair as set forth in claim 34, wherein the speed after the manual force is discontinued is the same as the speed that existed at the termination of the manual force input.

36. An electric motor, power assisted wheelchair as set forth in claim 1, wherein there is a force sensor and electric motor associated with each of the drive wheels, each controlled by a control as defined in claim 1.

37. An electric motor, power assisted wheelchair as set forth in claim 36, further including means for determining the relative strength of the arms of the rider and applying a compensating amount to the power assist so as to provide substantially constant speed of each wheel when the rider applies force to both of the hand wheels in the same percentage of his total strength.

38. An electric motor, power assisted wheelchair as set forth in claim 1, wherein the source of electrical power supplied to said electric motor comprises a battery.

39. An electric motor, power assisted wheelchair as set forth in claim 38, wherein the control varies the amount electrical power supplied to the electric motor by the battery by controlling the current supplied.

40. An electric motor, power assisted wheelchair as set forth in claim 38, wherein the control varies the amount electrical power supplied to the electric motor by the battery by controlling the voltage supplied.

41. An electric motor, power assisted wheelchair as set forth in claim 38, wherein the control varies the amount electrical power supplied to the electric motor by the battery by controlling the duty cycle of the electric supplied.

42. An electric motor, power assisted wheelchair as set forth in claim 40, wherein the control also varies the amount electrical power supplied to the electric motor by the battery by controlling the voltage supplied.

43. An electric motor, power assisted wheelchair as set forth in claim 42, wherein the control varies the amount electrical power supplied to the electric motor by the battery by controlling the duty cycle of the electric supplied.

44. An electric power assisted, manually propelled vehicle, said vehicle having a propulsion device for propelling said vehicle, a manual power input mechanism for applying manual power to said propulsion device for manually powering said vehicle, an electric motor operatively coupled to said vehicle propulsion device for applying an assist power to the propulsion device, a source of electrical power for said electric motor and a control for sensing the manual input force and vehicle speed for controlling the amount of electrical power transmitted from said source of electrical power to said electric motor, said control being effective to stop said power assist if said vehicle speed exceeds a first predetermined speed and apply a braking force to said vehicle through said electric motor by means of regenerative braking if the speed exceeds a second predetermined speed higher than said first predetermined speed.

45. An electric power assisted, manually propelled vehicle, said vehicle having a propulsion device for propelling said vehicle, a manual power input mechanism for applying manual power to said propulsion device for manually powering said vehicle, an electric motor operatively coupled to said vehicle propulsion device for applying an assist power to the propulsion device, and a control for sensing the manual input force and vehicle speed for controlling said electric motor, said control including a manual input sensor having a null or dead band condition wherein a predetermined amount of force must be exerted before the electric power-assist is applied said control adjusting said null or dead band range to be wider before said vehicle is in motion and once said vehicle is in operation, the width of the null or dead band is decreased by said control so as to provide quicker response.

* * * * *